United States Patent
Ahn et al.

(10) Patent No.: US 8,340,657 B2
(45) Date of Patent: Dec. 25, 2012

(54) METHOD FOR TRANSCEIVING SIGNAL IN MOBILE STATION IN MULTIPLE ANTENNA WIRELESS COMMUNICATION SYSTEM AND APPARATUS THEREFOR

(75) Inventors: Seungjin Ahn, Gunpo-si (KR); Sunghoon Jung, Seoul (KR); Joondong Lee, Seoul (KR); Wonyong Yoon, Seoul (KR); Sangwoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 13/176,670

(22) Filed: Jul. 5, 2011

(65) Prior Publication Data
US 2012/0258716 A1 Oct. 11, 2012

(30) Foreign Application Priority Data
Apr. 8, 2011 (KR) .................. 10-2011-0032831

(51) Int. Cl.
*H04W 4/00* (2009.01)

(52) U.S. Cl. ............... 455/422.1; 455/435.1; 455/435.2; 455/566; 455/457; 455/443; 455/444; 455/436; 455/437; 455/438; 370/331

(58) Field of Classification Search ............... 455/422.1, 455/442.1, 436–444, 566, 435.1, 435.2; 370/331
See application file for complete search history.

(56) References Cited

U.S. PATENT DOCUMENTS

| | | | | |
|---|---|---|---|---|
| 5,497,506 | A * | 3/1996 | Takeyasu .................. | 455/575.8 |
| 5,594,782 | A * | 1/1997 | Zicker et al. .................. | 455/417 |
| 5,617,468 | A * | 4/1997 | Nojima et al. .................. | 455/421 |
| 6,084,866 | A * | 7/2000 | Dorenbosch et al. ......... | 370/331 |
| 8,155,670 | B2 * | 4/2012 | Fullam et al. ............. | 455/456.3 |
| 8,160,589 | B2 * | 4/2012 | Kuwahara .................... | 455/440 |
| 2001/0005681 | A1 * | 6/2001 | Kim ............................. | 455/458 |
| 2005/0059416 | A1 * | 3/2005 | Ono .............................. | 455/457 |
| 2005/0221824 | A1 * | 10/2005 | Lee et al. .................. | 455/435.2 |
| 2005/0239479 | A1 * | 10/2005 | Bednasz .................... | 455/456.1 |
| 2005/0288065 | A1 * | 12/2005 | Schmerts ...................... | 455/566 |
| 2007/0155374 | A1 * | 7/2007 | Yang ............................. | 455/421 |
| 2007/0191069 | A1 * | 8/2007 | Matsumoto .................. | 455/566 |
| 2007/0243880 | A1 * | 10/2007 | Gits et al. .................. | 455/456.1 |
| 2010/0113067 | A1 * | 5/2010 | Fullam et al. ............. | 455/456.3 |
| 2010/0167725 | A1 * | 7/2010 | Noldus et al. ................. | 455/433 |
| 2012/0214495 | A1 * | 8/2012 | Choi et al. .................... | 455/444 |

* cited by examiner

*Primary Examiner* — Charles Shedrick
(74) *Attorney, Agent, or Firm* — Lee, Hong, Degerman, Kang & Waimey

(57) ABSTRACT

A mobile station provided with multiple antennas in a wireless communication system is disclosed. More specifically, the mobile station displays an overlap zone entry notification message received from a macro base station if the mobile station enters an overlap zone between the macro base station and a femto base station, and an user selects an antenna driving mode of the multiple antennas. And then, the mobile station transmit and receive signals to and from at least one of the macro base station and the femto base station in accordance with the selected antenna driving mode.

11 Claims, 10 Drawing Sheets

METHOD FOR TRANSCEIVING SIGNAL IN MOBILE STATION IN MULTIPLE ANTENNA WIRELESS COMMUNICATION SYSTEM AND APPARATUS THEREFOR

CROSS-REFERENCE TO RELATED APPLICATIONS

Pursuant to 35 U.S.C. §119(a), this application claims the benefit of earlier filing date and right of priority to Korean Patent Application No. 10-2011-0032831, filed on Apr. 8, 2011, the contents of which are hereby incorporated by reference herein in its entirety.

BACKGROUND OF THE INVENTION

1. Field of the Invention

The present invention relates to a multiple antenna wireless communication system, and more particularly, to a method for transceiving a signal in a mobile station of a multiple antenna wireless communication system and an apparatus therefor.

2. Discussion of the Related Art

A $3^{rd}$ generation partnership project long term evolution (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify time and frequency domains to which data will be transmitted and information related to encoding, data size, hybrid automatic repeat and request (HARQ). Also, the base station transmits uplink (UL) scheduling information of uplink data to the corresponding user equipment to notify time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

SUMMARY OF THE INVENTION

Accordingly, the present invention is directed to a method for transceiving a signal in a mobile station of a multiple antenna wireless communication system and an apparatus therefor, which substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile station provided with multiple antennas in a wireless communication system comprises a display module; a user input module for receiving a command from a user; a plurality of communication modules for respectively transmitting and receiving signals to and from a plurality of base stations; and a processor for processing the signals received from the plurality of base stations, wherein the processor controls the mobile station to display an overlap zone entry notification message received from a macro base station in the display module if the mobile station enters an overlap zone between the macro base station and a femto base station, selects an antenna driving mode of the multiple antennas in accordance with an input signal transmitted through the user input module, and controls the wireless communication modules to transmit and receive signals to and from at least one of the macro base station and the femto base station in accordance with the selected antenna driving mode, a first mode of the antenna driving mode performs signal transmission and reception through spatial multiplexing or transmission diversity from the femto base station through handover to the femto base station, a first antenna of the multiple antennas based on a second mode of the antenna driving mode transmits and receives a signal to and from the femto base station, and a second antenna of the multiple antennas based on the second mode of the antenna driving mode transmits and receives a signal to and from the macro base station.

In this case, the first antenna and the second antenna based on the second mode of the antenna driving mode transmit and receive different data to and from each other through different frequency bands. A service provided from the femto base station is different from a service provided from the macro base station at the second mode of the antenna driving mode.

Preferably, a third mode of the antenna driving mode transmits and receives the same data to and from the femto base station and the macro base station through different frequency bands.

More preferably, if the second mode of the antenna driving mode is selected, the processor configures the service provided from the femto base station and the service provided from the macro base station in accordance with the input signal transmitted through the user input module.

In this case, the display module and the user input module integrally form a touch screen that recognizes touch input of a user.

In another aspect of the present invention, a method for transceiving a signal in a mobile station provided with multiple antennas comprises receiving an overlap zone entry notification message from a macro base station if the mobile station enters an overlap zone between the macro base station and a femto base station; selecting an antenna driving mode of the multiple antennas; and transmitting and receiving signals to and from at least one of the macro base station and the femto base station in accordance with the selected antenna driving mode, wherein a first mode of the antenna driving mode performs signal transmission and reception through spatial multiplexing or transmission diversity from the femto base station through handover to the femto base station, a first antenna of the multiple antennas based on a second mode of the antenna driving mode transmits and receives a signal to and from the femto base station, and a second antenna of the multiple antennas based on the second mode of the antenna driving mode transmits and receives a signal to and from the macro base station.

According to the embodiments of the present invention, the mobile station of the multiple antenna wireless communication system can transmit and receive a signal by efficiently using multiple antennas.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Figure 1:
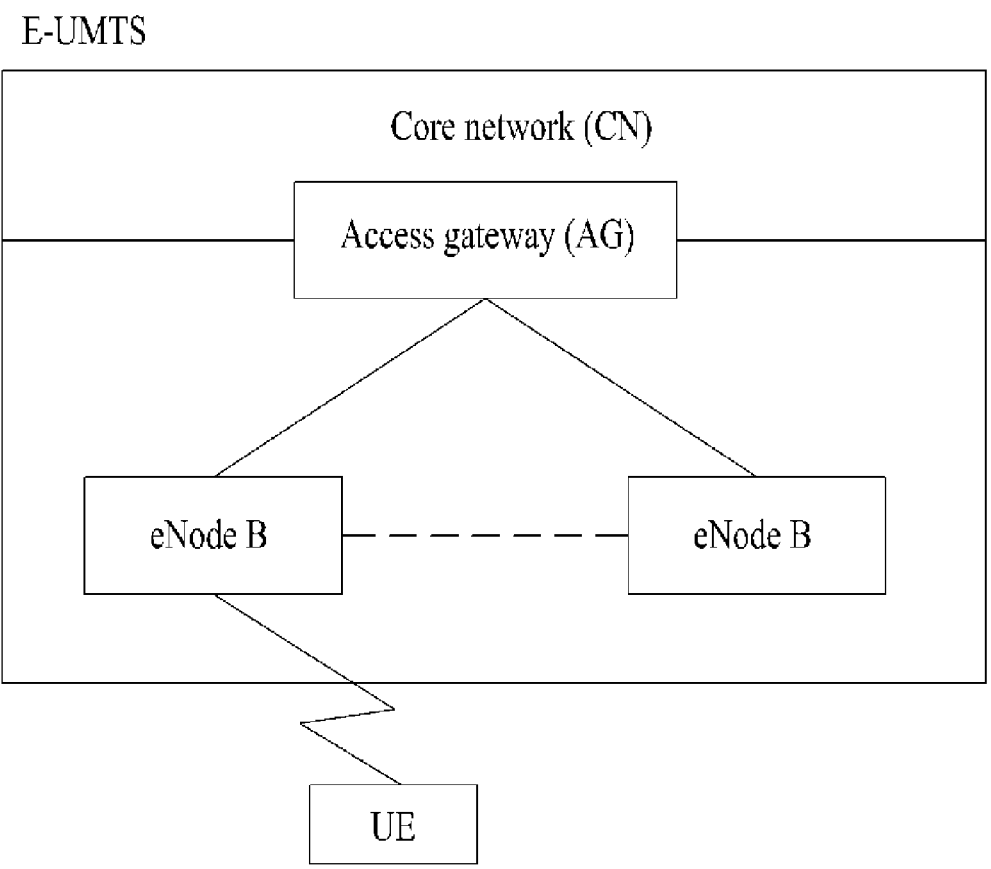
FIG. 1 is a diagram illustrating a network structure of an Evolved Universal Mobile Telecommunications System (E-UMTS) which is an example of a mobile communication system.
Figure 2:
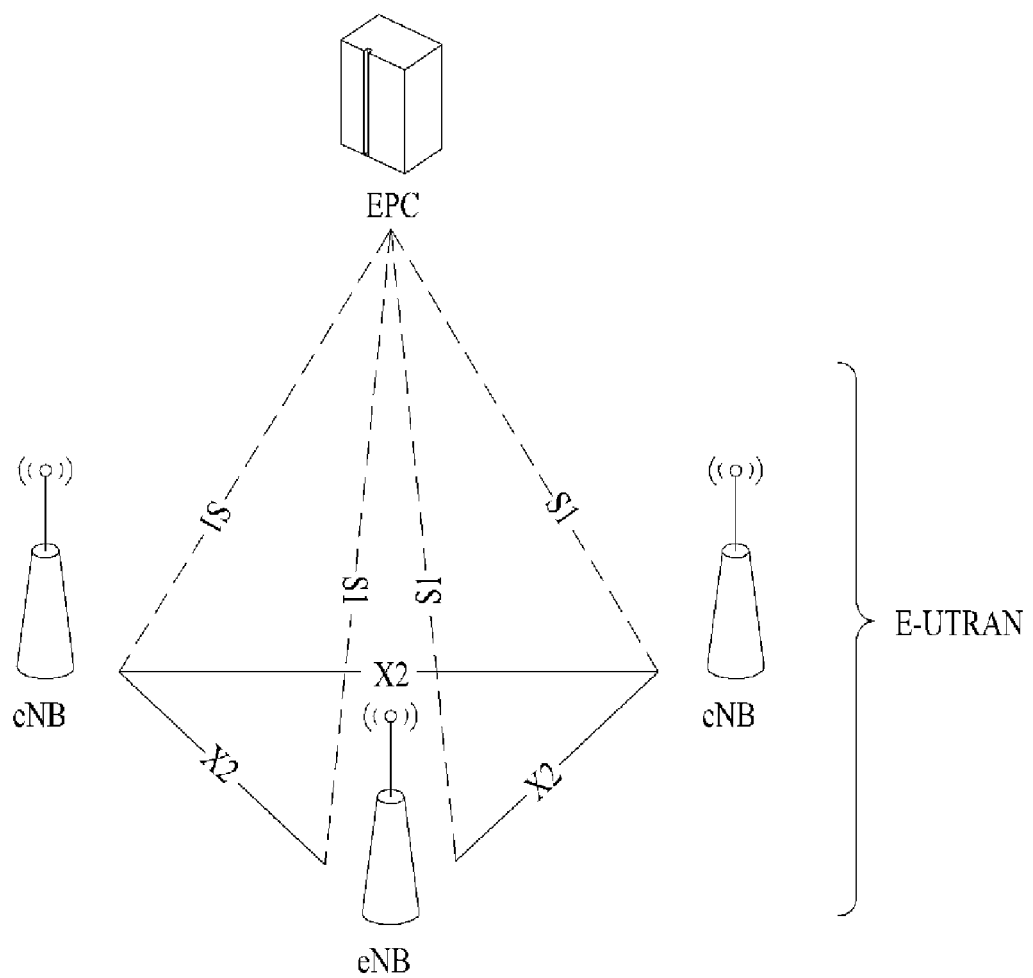
FIG. 2 is a diagram conceptionally illustrating a network structure of an Evolved Universal Terrestrial Radio Access Network (E-UTRAN)

FIG. 2 is a diagram conceptionally illustrating a network structure of an Evolved Universal Terrestrial Radio Access Network (E-UTRAN).

Referring to FIG. 2, the E-UTRAN system is a system evolving from the conventional UTRAN system and. The E-UTRAN includes cells (eNB) connected with one another through X2 interface. Each of eNBs is connected with a user equipment through a radio interface and connected with an Evolved Packet Core (EPC) through S1 interface.

The EPC includes a mobility management entity (MME), a serving-gateway (S-GW), and a packet data network-gateway (PDN-GW). The MME includes access information of the user equipment or ability information of the user equipment, wherein the access information or the ability information is mainly used for mobility management of the user equipment. The S-GW is a gateway having the E-UTRAN as an end point, and the PDN-GW is a gateway having a PDN as an end point.

Figure 3:
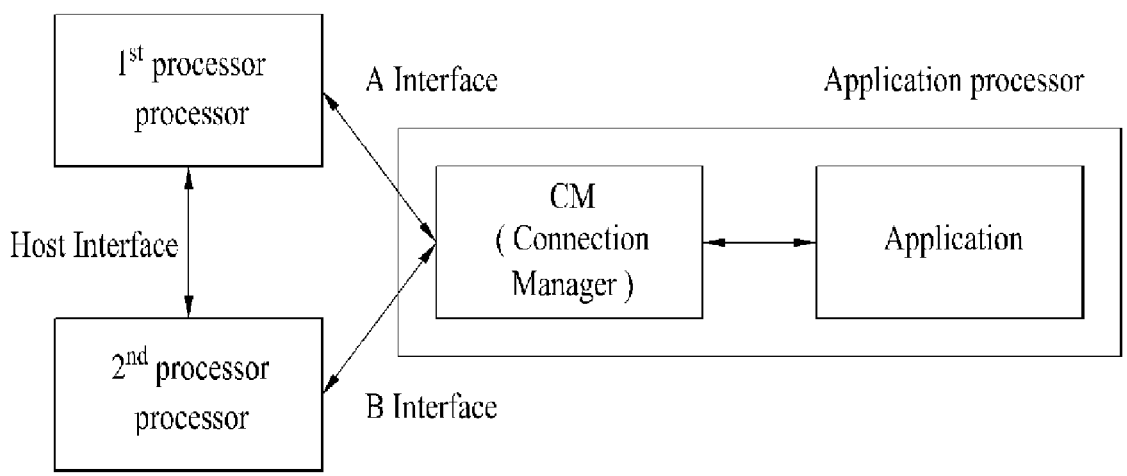
FIG. 3 is a diagram illustrating a structure of a dual mode user equipment.

FIG. 3 is a diagram illustrating a structure of a dual mode user equipment.

Referring to FIG. 3, the dual mode user equipment includes an application processor, a first modem processor for processing a signal received from a first communication network, and a second modem processor for processing a signal received from a second communication network.

The application processor may be configured as one module by hardware inside the dual mode user equipment, or may be included in a PC independently from the dual mode user equipment. Also, the application processor can include a connection manager (CM) for managing and controlling a connection status to the first communication network or the second communication network in accordance with a network condition.

In more detail, the CM serves to perform switching for transmitting and receiving data between an application and any one of the first modem processor and the second modem processor in accordance with the network connection status. In other words, if the dual mode user equipment is connected with the first communication network, the CM transmits and receives application data to and from interface A so that the first modem processor is connected with the application. If the dual mode user equipment is connected with the second communication network, the CM transmits and receives application data to and from interface B so that the second modem processor is connected with the application.

A host interface is located between the first modem processor and the second modem processor, and can be used for control signal transmission and data signal transmission between the respective processors.

Hereinafter, a multiple-Input Multiple-Output (MIMO) system will be described. The MIMO means a scheme that uses a plurality of transmitting antennas and a plurality of receiving antennas. Transmission and reception efficiency of data can be improved by the MIMO scheme. Namely, a transmitting side or receiving side of a wireless communication system can enhance capacity and improve throughput by using a plurality of antennas. Hereinafter, the MIMO may be referred to as 'MIMO antenna'.

The MIMO antenna technology does not depend on a signal antenna path to receive a whole message. Instead, in the MIMO antenna technology, data fragments received from a plurality of antennas are incorporated to complete data. If the MIMO antenna technology is used, a data transmission rate can be improved within a specific sized cell region, or system coverage can be enhanced with a specific data transmission rate. Also, the MIMO antenna technology can widely be used for a user equipment for mobile communication and a relay node. According to the MIMO antenna technology, it is possible to overcome limitation of a transmission rate in mobile communication according to the related art where a single antenna is used.

Figure 4:
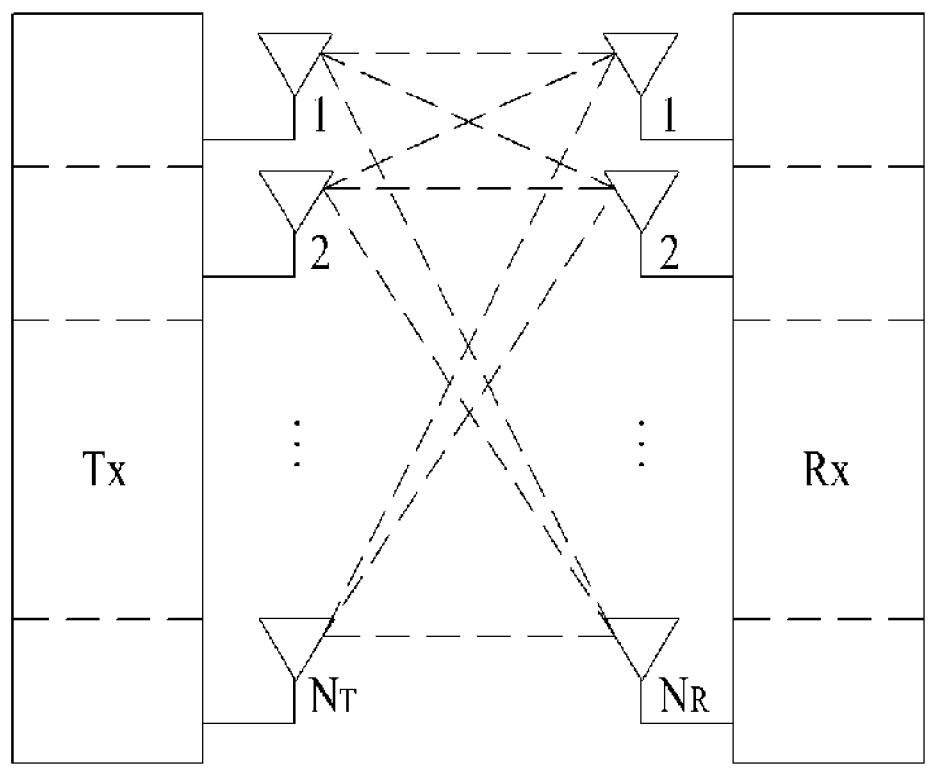
FIG. 4 is a schematic diagram illustrating a multiple input multiple output (MIMO) communication system according to the present invention.

A schematic view of a general MIMO communication system is illustrated in FIG. 4. Referring to FIG. 4, $N_T$ number of transmitting antennas are provided at a transmitting side while $N_R$ number of receiving antennas are provided at a receiving side. If a plurality of antennas are used at both the transmitting side and the receiving side, theoretical channel transmission capacity is more increased than that a plurality of antennas are used at any one of the transmitting side and the receiving side. Increase of the channel transmission capacity is proportional to the number of antennas. Accordingly, the transmission rate is improved, and frequency efficiency is also improved. Supposing that a maximum transmission rate is $R_O$ when a single antenna is used, a transmission rate corresponding to a case where multiple antennas are used can be increased theoretically as much as a value obtained by multiplying a maximum transmission rate $R_O$ by a rate increase $R_i$.

In the mean time, the LTE system has a bit rate more excellent that those of the WCDCMA system and the GSM system. Theoretically, the bit rate of the LTE system may be similar to or better than WIFI. Also, the LTE system may consider a femto base station in addition to a macro base station. The femto base station is configured in such a manner that the existing base station is miniaturized to provide a service within a limited zone only, like WIFI.

Figure 5:
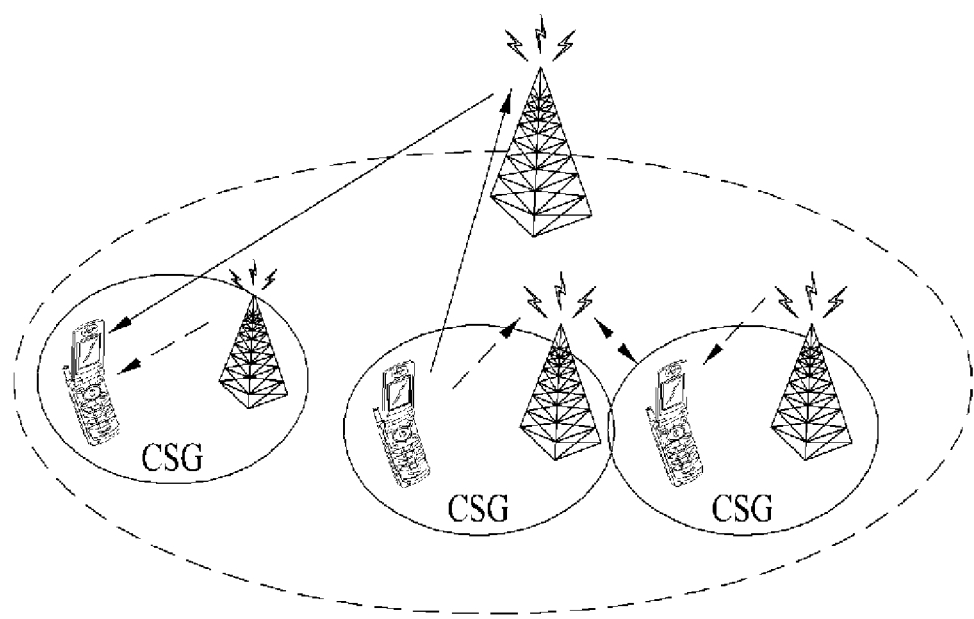
FIG. 5 is a diagram illustrating a concept of a femto base station (home eNB; HeNB) in an LTE system.

FIG. 5 is a diagram illustrating a concept of a femto base station (home eNB; HeNB) in an LTE system.

Referring to FIG. 5, a base station of small coverage, i.e., femto base station (HeNB) is provided within the coverage of an external large base station, i.e., macro base station (macro eNB), when an LTE network is configured, whereby the mobile station can actually access both the macro base station and the femto base station. Also, in order to reduce inter-cell interference, different frequency bands should be used between the macro base station and the femto base station. Also, since handover can be performed between the macro base station and the femto base station, mobility is ensured. In other words, if the mobile station is located beyond a closed subscriber group (CSG) in FIG. 4, handover is performed between the mobile station and another CSG or between the mobile station and the macro base station.

Also, if the mobile station enters the CSG, it is likely that the mobile station may receive a better service from the base station closer thereto. Accordingly, the mobile station accesses the femto base station within the CSG through handover. In this case, the mobile station can transmit and receive data to and from both the macro base station and the femto base station, whereby the user can improve radio capacity as much as twice. Also, since a coordinated multi point (CoMP) scheme can be applied between the macro base station and the femto base station, the mobile station may increase a reception rate of data by distributively receiving the same data from both the macro base station and the femto base station. In this case, the CoMP scheme means that the base stations transmit different data to one mobile station to perform a function such as spatial multiplexing.

In the mean time, it is preferable that the macro base station uses a frequency band different from that of the femto base station (HeNB). Since it is general that the femto base station exists within the zone of the macro base station as illustrated in FIG. 4, if the femto base station and the macro base station use the same frequency band, mutual interference may seriously occur. For this reason, serious performance degradation of the mobile station may occur. Accordingly, inter-frequency handover is performed between the macro base station and the femto base station. However, if respective zones of the femto base stations are not overlapped with each other as illustrated in FIG. 4, the respective femto base stations can use the same frequency band.

If the mobile station provided with multiple antennas is operated in accordance with a general MIMO mode, it repeatedly searches for the femto base station overlapped with the macro base station. For this reason, it is likely that a problem of power consumption occurs. Also, maximum performance ideal for the MIMO mode does not occur in an actual radio condition. Instead, it is likely that the result similar to that of a mobile station provided with a single antenna may occur in an actual radio condition.

In this respect, the present invention suggests that one of two antennas is used for access to the femto base station (HeNB) and the other one is used for access to the macro base station of the LTE system or the macro base station of the legacy system such as the existing WCDMA system and the GSM system. In this case, the number of handover times can be reduced during motion of the mobile station, and power consumption of each antenna can be reduced due to the limited search for the base station. In other words, the mobile station can perform communication with each of the base stations of different frequency bands in accordance with a single antenna mode through two antennas provided therein.

For example, the mobile station performs audio communication, which is a circuit switching (CS) service, with the macro base station of the legacy system through one antenna and at the same time performs transmission and reception of moving picture files, which is a packet switching (PS) service, to and from the femto base station through another antenna.

Also, even if the macro base station is the LTE system, which provides a packet switching (PS) service, not the legacy system which provides a circuit switching (CS) service, a specific service provided by the LTE system may be limited to one antenna. For example, VoIP has a request bit rate relatively lower than that of FTP or web browsing. In this case, since the femto base station is closer to the mobile station than the macro base station, a high bit rate can be provided. Accordingly, the mobile station can receive VoIP through the macro base station of the LTE system and one antenna, and can receive FTP or web browsing through the femto base station and the other antenna.

Figure 6A:
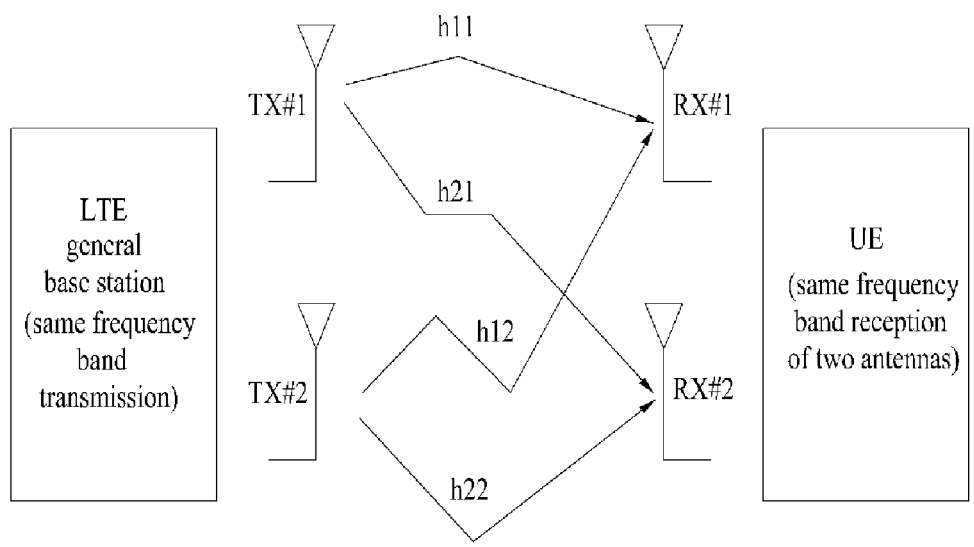
FIG. 6*a* is a conceptional diagram illustrating that a mobile station is operated in a MIMO communication system in accordance with a general MIMO mode.
Figure 6B:
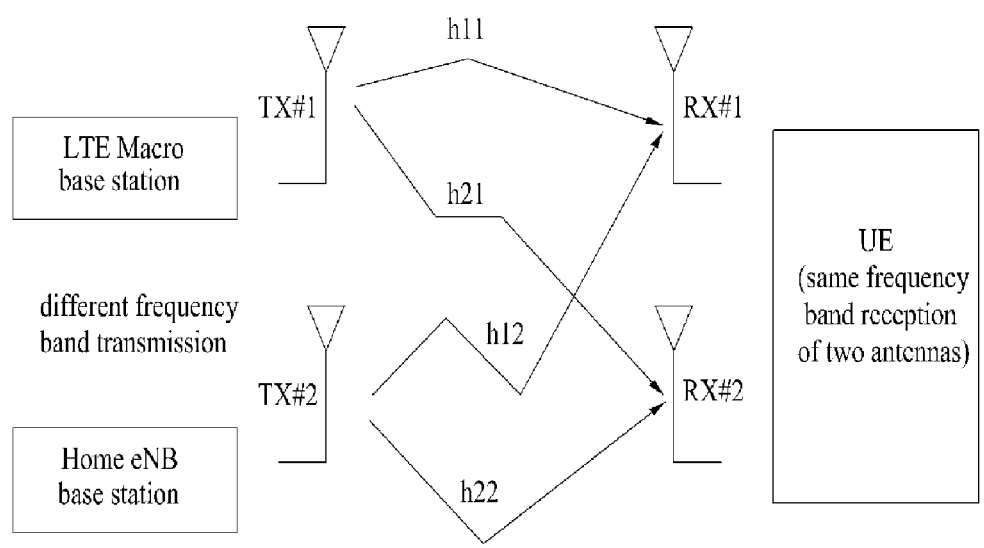
FIG. 6*b* is a conceptional diagram illustrating an example of communication performed in a MIMO communication system in accordance with the embodiment of the present invention.

FIG. 6a is a conceptional diagram illustrating that a mobile station is operated in a MIMO communication system in accordance with a general MIMO mode, and FIG. 6b is a conceptional diagram illustrating an example of communication performed in a MIMO communication system in accordance with the embodiment of the present invention.

As illustrated in FIG. 6a, the general MIMO mode means that one base station transmits data through the same frequency band from different antennas. In the mean time, as illustrated in FIG. 6b, in the present invention, two base stations can transmit data through different frequency bands, and the mobile station can receive the data from each base station through each antenna. To this end, the mobile station can include a plurality of modem processors as illustrated in FIG. 3 to process the signals received from the different frequency bands.

In the mean time, in order to increase convenience of the user, if the mobile station enters an overlap zone between the macro base station and the femto base station, the present invention suggests that a network operator transmits an overlap zone entry notification message through a text message to indicate that the mobile station has entered the overlap zone. Also, if the mobile station enters the corresponding zone, it is preferable that the dual mode user equipment of the present invention is provided with a user interface, which determines whether to operate in accordance with the general MIMO mode or to receive a separate service per antenna from each of the macro base station and the femto base station.

Figure 7:
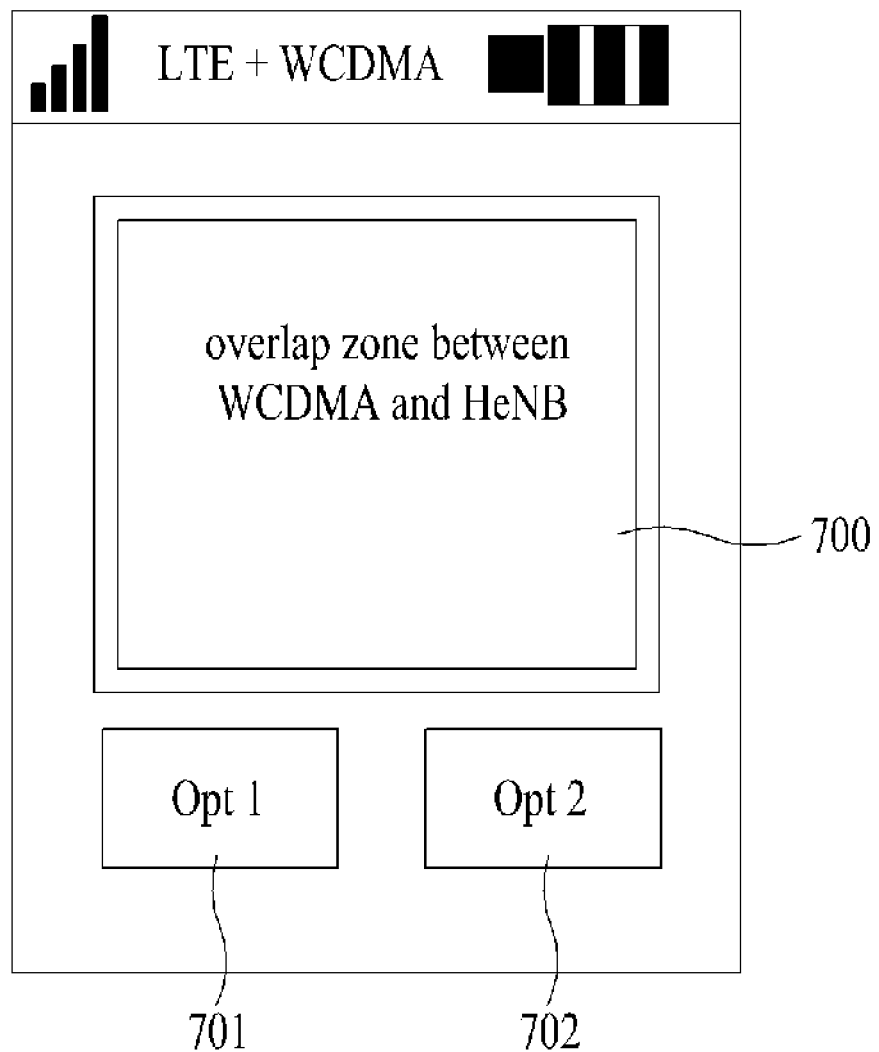
FIG. 7 is a diagram illustrating an example of a user interface provided to a user when a mobile station enters a zone where a macro base station is overlapped with a femto base station, in accordance with the embodiment of the present invention.

FIG. 7 is a diagram illustrating an example of a user interface provided to a user when a mobile station enters a zone where a macro base station is overlapped with a femto base station, in accordance with the embodiment of the present invention.

Referring to FIG. 7, if the mobile station enters the overlap zone between the femto base station and the macro base station of the WCDMA system, a text message 700 provided from the base station before handover, i.e., overlap zone entry notification message is provided to the mobile station. Also, if the mobile station receives the text message, it provides a user interface, which can determine an operation mode of the mobile station, to the user. In other words, an option 1 701 and an option 2 702 are displayed as illustrated in FIG. 7 to allow the user to select any one of the options. The option 1 701 is a general MIMO mode, and means handover to the femto base station. If the option 1 701 is selected, the mobile station releases connection with the macro base station of the WCDMA system.

Also, the option 2 702 serves to connect two antennas with the macro base station and the femto base station, respectively, as suggested in the present invention, so as to receive a separate service.

Figure 8:
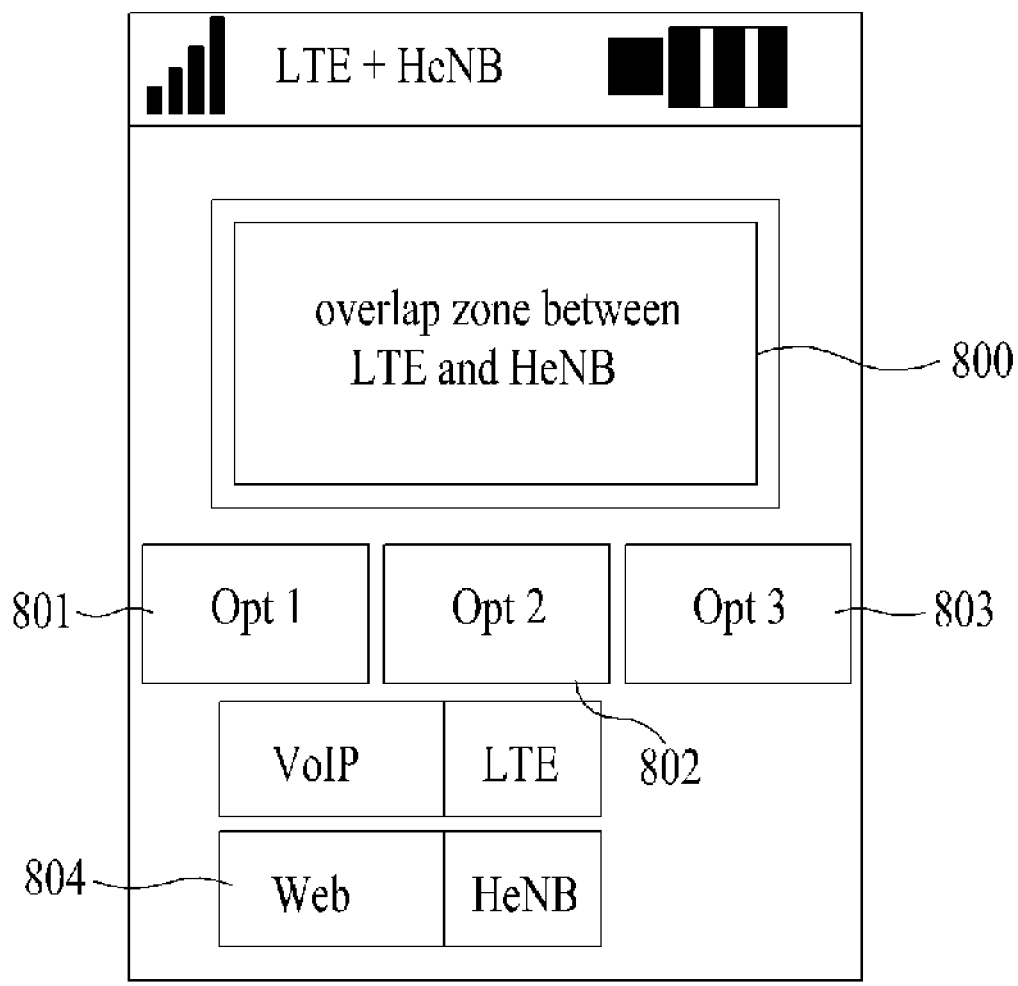
FIG. 8 is a diagram illustrating another example of a user interface provided to a user when a mobile station enters a zone where a macro base station is overlapped with a femto base station, in accordance with the embodiment of the present invention.

FIG. 8 is a diagram illustrating another example of a user interface provided to a user when a mobile station enters a zone where a macro base station is overlapped with a femto base station, in accordance with the embodiment of the present invention.

Referring to FIG. 8, if the mobile station enters the overlap zone between the macro base station and the femto base station, a text message 800 provided from the base station before handover, i.e., overlap zone entry notification message is provided to the mobile station. Also, FIG. 8 is different from FIG. 7 in that three options 801 to 803 may be provided depending on functions of the antennas.

First of all, the option 1 801 is a general MIMO mode, and means handover to the femto base station. If the option 1 801 is selected, the mobile station transmits and receives data to and from the femto base station. If the mobile station is released from the overlap zone, it again performs handover to the macro base station to transmit and receive data.

The option 2 802 serves to connect two antennas with the macro base station and the femto base station, respectively, as suggested in the present invention, so as to receive a separate service. It is preferable that the mobile station additionally provides a specific service and a user interface 804 to the user, wherein the user interface 804 can configure the corresponding base station. In other words, the user interface 804 that can connect VoIP with the macro base station and web search or FTP service with the femto base station is exemplarily illustrated in FIG. 8.

Finally, the option 3 803 is an inter-frequency MIMO mode, and can serve to allow the mobile station to receive the same service from both the macro base station and the femto base station different through different frequency bands. In this case, it is preferable that the macro base station and the femto base station mutually share data and resource allocation information through X2 interface.

In the mean time, if the mobile station enters the zone where the macro base station is overlapped with the femto base station, this fact has been notified to the user through the text message and then the user interface has been suggested in FIG. 7 and FIG. 8. However, the user interface may previously be configured, so that the mobile station may be operated in accordance with the previously configured user interface if it enters the overlap zone.

Figure 9:
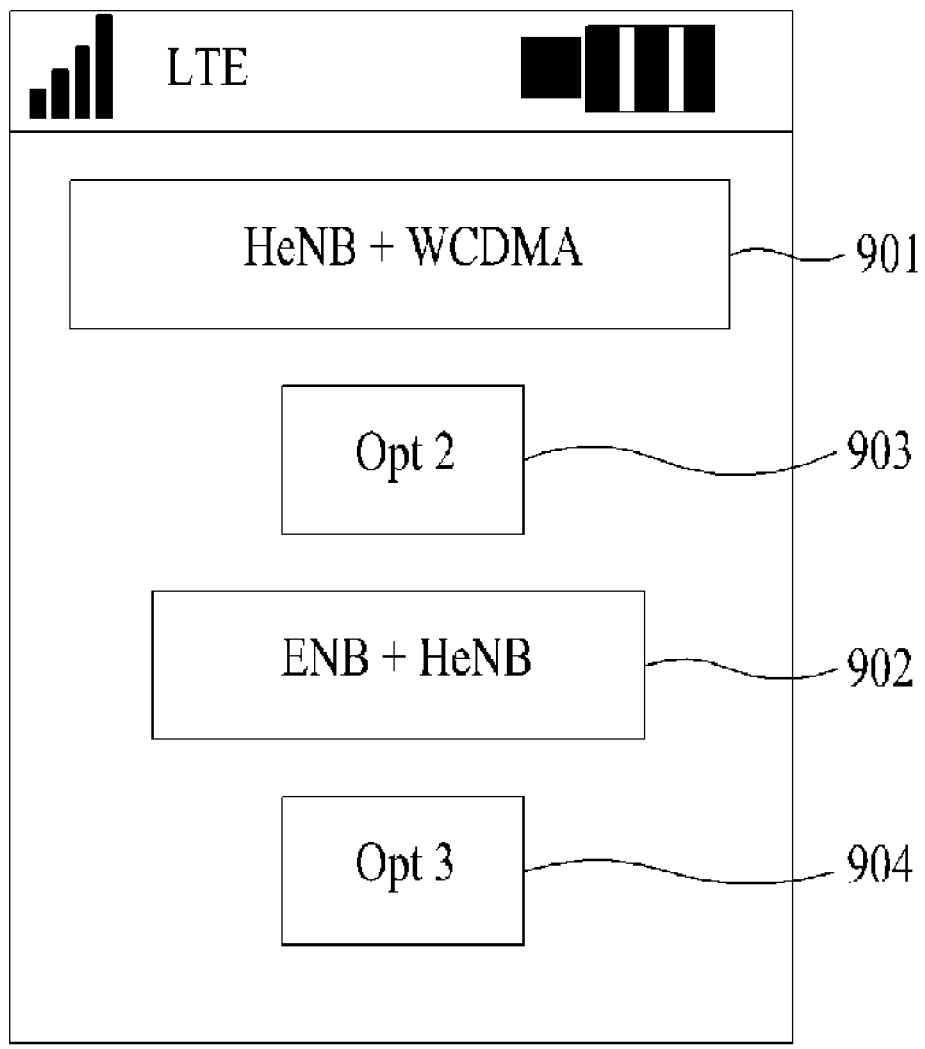
FIG. 9 is a diagram illustrating an example of a user interface according to the embodiment of the present invention.

FIG. 9 is a diagram illustrating an example of a user interface according to the embodiment of the present invention.

Referring to FIG. 9, if the mobile station is located at the overlap zone between the femto base station and the macro base station of the WCDMA system as illustrated in FIG. 7, a user interface 901 is previously configured so that the mobile station is operated in accordance with an option 2 903. Also, if the mobile station is located at the overlap zone between the femto base station and the macro base station of the LTE system as illustrated in FIG. 8, a user interface 902 is previously configured so that the mobile station is operated in accordance with an option 3 904. In particular, if the option 3 904 is selected, a user interface, which selects a service desired from each base station, may be configured.

Figure 10:
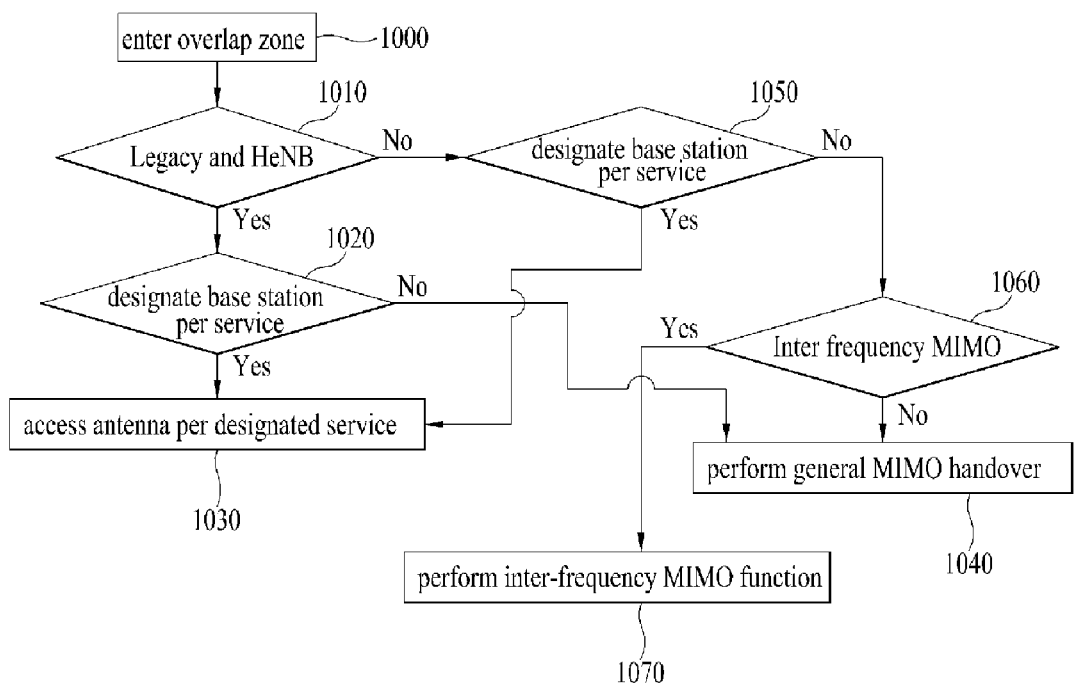
FIG. 10 is a flow chart illustrating an operation method of a mobile station according to the embodiment of the present invention.

FIG. 10 is a flow chart illustrating an operation method of a mobile station according to the embodiment of the present invention.

Referring to FIG. 10, the mobile station recognizes that it has entered the overlap zone between the macro base station and the femto base station, through a text message or specific network signaling from the network operator at step 1000. In this case, the mobile station determines whether the femto base station is overlapped with the macro base station of the LTE system or the macro base station of the legacy system, at step 1010.

If the femto base station is overlapped with the macro base station of the legacy system, the mobile station identifies whether the base station is designated per service like the option 2 of FIG. 7 or designation of the base station per service is input from the user, at step 1020. If the base station is designated per service, the mobile station is provided with the designated services from different base stations configured through each antenna at step 1030. Also, if the base station is not designated per service, or if the option 1 of FIG.

7 is selected by the user, the mobile station releases connection with the macro base station of the legacy system by performing general handover at step 1040, and transmits and receives a signal to and from the femto base station.

Subsequently, if the femto base station is overlapped with the macro base station of the LTE system, the mobile station identifies whether the base station is designated per service like the option 2 of FIG. 8 or designation of the base station per service is input from the user, at step 1050. If the base station is designated per service, the mobile station is provided with the designated services from different base stations configured through each antenna at step 1030.

In the mean time, if the base station is not designated per service, the mobile station identifies whether the inter-frequency MIMO mode corresponding to the option 3 of FIG. 8 is configured at step 1060. If the inter-frequency MIMO mode is configured, the mobile station transmits and receives a signal to and from the femto base station and the macro base station of the LTE system in accordance with the inter-frequency MIMO mode at step 1070. Finally, if the inter-frequency MIMO mode is not configured, or if the option 1 of FIG. 8 is selected by the user, the mobile station releases connection with the macro base station of the LTE system by performing general handover at step 1040, and transmits and receives a signal to and from the femto base station.

Although the mobile station has been provided with two antennas in the present invention, if the number of antennas increases like the LTE-A system, the present invention can be applied to adapt to the number of antennas by the person with ordinary skill in the art to which the present invention pertains.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the mobile station and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the mobile station may be replaced with terms such as a user equipment (UE) and a mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A mobile station provided with multiple antennas in a wireless communication system, the mobile station comprising:
   a display module;
   a user input module for receiving a command from a user;
   a plurality of communication modules for respectively transmitting and receiving signals to and from a plurality of base stations; and
   a processor for processing the signals received from the plurality of base stations,
   wherein the processor controls the mobile station to display an overlap zone entry notification message received from a macro base station in the display module if the mobile station enters an overlap zone between the macro base station and a femto base station, selects an antenna driving mode of the multiple antennas in accordance with an input signal transmitted through the user input module, and controls the wireless communication modules to transmit and receive signals to and from at least one of the macro base station and the femto base station in accordance with the selected antenna driving mode,
   a first mode of the antenna driving mode performs signal transmission and reception through spatial multiplexing or transmission diversity from the femto base station through handover to the femto base station,
   a first antenna of the multiple antennas based on a second mode of the antenna driving mode transmits and receives a signal to and from the femto base station, and
   a second antenna of the multiple antennas based on the second mode of the antenna driving mode transmits and receives a signal to and from the macro base station.

2. The mobile station of claim 1, wherein the first antenna and the second antenna based on the second mode of the antenna driving mode transmit and receive different data to and from each other through different frequency bands.

3. The mobile station of claim 1, wherein a third mode of the antenna driving mode transmits and receives the same data to and from the femto base station and the macro base station through different frequency bands.

4. The mobile station of claim 1, wherein a service provided from the femto base station is different from a service provided from the macro base station at the second mode of the antenna driving mode.

5. The mobile station of claim 1, wherein, if the second mode of the antenna driving mode is selected, the processor configures the service provided from the femto base station and the service provided from the macro base station in accordance with the input signal transmitted through the user input module.

6. The mobile station of claim 1, wherein the display module and the user input module integrally form a touch screen that recognizes touch input of a user.

7. A method for transceiving a signal in a mobile station provided with multiple antennas, the method comprising:
   receiving an overlap zone entry notification message from a macro base station if the mobile station enters an overlap zone between the macro base station and a femto base station;
   selecting an antenna driving mode of the multiple antennas; and
   transmitting and receiving signals to and from at least one of the macro base station and the femto base station in accordance with the selected antenna driving mode,
   wherein a first mode of the antenna driving mode performs signal transmission and reception through spatial multiplexing or transmission diversity from the femto base station through handover to the femto base station,
   a first antenna of the multiple antennas based on a second mode of the antenna driving mode transmits and receives a signal to and from the femto base station, and
   a second antenna of the multiple antennas based on the second mode of the antenna driving mode transmits and receives a signal to and from the macro base station.

8. The method of claim 7, wherein the first antenna and the second antenna based on the second mode of the antenna driving mode transmit and receive different data to and from each other through different frequency bands.

9. The method of claim 7, wherein a third mode of the antenna driving mode transmits and receives the same data to and from the femto base station and the macro base station through different frequency bands.

10. The method of claim 7, wherein a service provided from the femto base station is different from a service provided from the macro base station at the second mode of the antenna driving mode.

11. The method of claim 7, further comprising, if the second mode of the antenna driving mode is selected, configuring the service provided from the femto base station and the service provided from the macro base station.

* * * * *